US005582652A

United States Patent [19]

Robertson et al.

[11] Patent Number: 5,582,652

[45] Date of Patent: Dec. 10, 1996

[54] METHOD FOR REMOVING FINES FROM A CRUDE OIL TANK

[75] Inventors: Glenn D. Robertson, Millarville; John F. Brown, Calgary, both of Canada

[73] Assignees: Koch Exploration Canada Ltd, Calgary; Sandman Oilfield Services Ltd., Millarville, both of Canada

[21] Appl. No.: 384,675

[22] Filed: Feb. 3, 1995

Related U.S. Application Data

[63] Continuation-in-part of Ser. No. 159,447, Nov. 29, 1993, abandoned.

[51] Int. Cl.[6] .............................. B01D 11/02; B08B 7/00

[52] U.S. Cl. .................. 134/22.12; 134/22.1; 134/22.18; 210/634

[58] Field of Search ................................ 134/22.1, 22.12, 134/22.18, 22.11; 210/634

[56] References Cited

U.S. PATENT DOCUMENTS

| | | | |
|---|---|---|---|
| 3,382,934 | 5/1968 | Spear | 175/171 |
| 4,328,094 | 5/1982 | Peck | 134/25.1 |
| 4,836,017 | 6/1989 | Bozek | 73/155 |
| 4,995,495 | 2/1991 | Krynski | 196/46 |
| 5,091,016 | 2/1992 | Krajicek et al. | 134/22.18 |
| 5,152,843 | 10/1992 | McDonald et al. | 134/22.1 |

FOREIGN PATENT DOCUMENTS

| | | |
|---|---|---|
| 1052316 | 12/1966 | United Kingdom . |
| 1414829 | 11/1975 | United Kingdom . |

*Primary Examiner*—Zeinab El-Arini
*Attorney, Agent, or Firm*—Shook, Hardy & Bacon L.L.P.

[57] ABSTRACT

A method for removing fines, such as sand, from a crude oil tank generally includes the steps of directing a fluid into the bottom of the tank to stir up the sand settled therein to create a sand and fluid slurry. The method further includes the step of suctioning the slurry from the tank. To accomplish the steps, a pressure line is coupled to a pump which jettisons fluid through holes in the pressure line located near the bottom of the oil tank to stir the fines, thereby creating a slurry. A drain line is also located near the bottom of the tank, and is coupled to another pump for simultaneously suctioning the slurry through the drain line outside of the tank. A gravel or dump truck, or the like, is retrofitted with the pressure line and drain line pumps and tubing adapted to couple the drain line to the bed of the truck so that the slurry is extracted from the tank through the drain line into the bed of the truck.

4 Claims, 3 Drawing Sheets

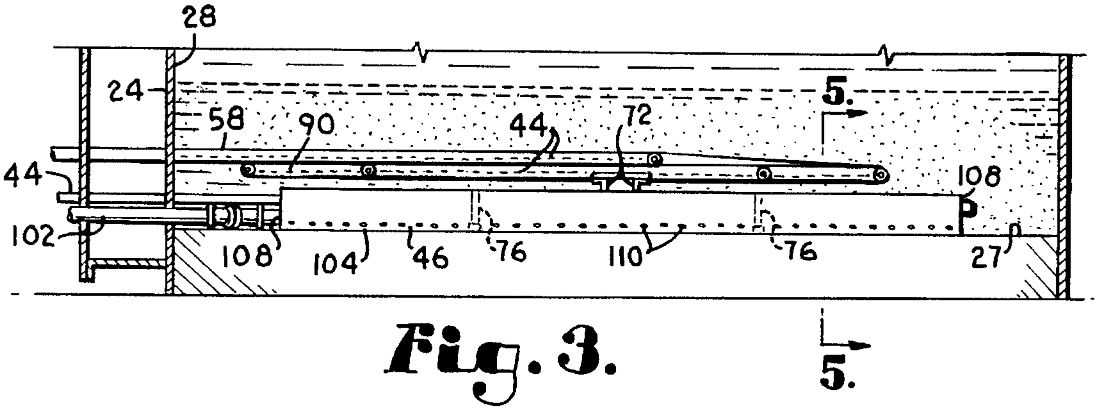
Fig. 3.
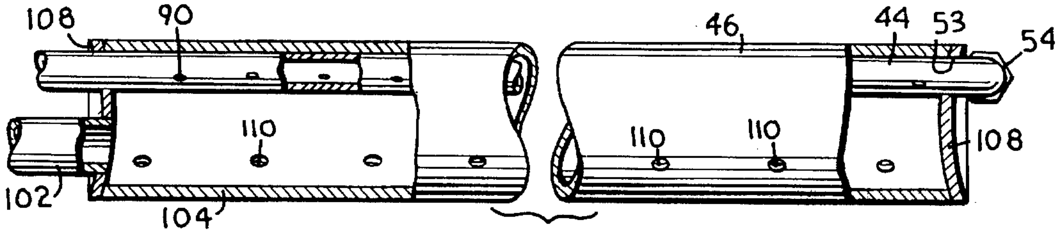
Fig. 4.
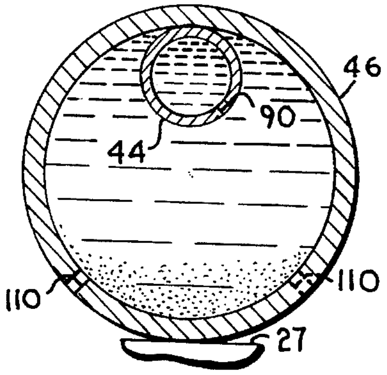
Fig. 5.
Fig. 6.
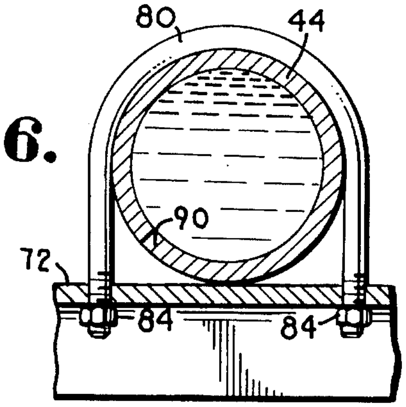
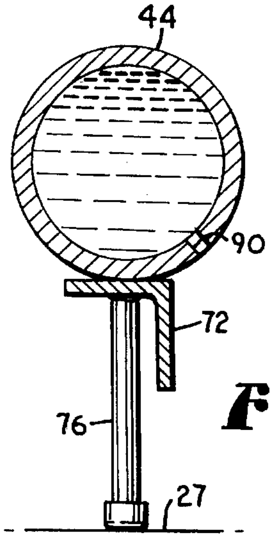
Fig. 7.

METHOD FOR REMOVING FINES FROM A CRUDE OIL TANK

This is a continuation-in-part of application Ser. No. 08/159,447 filed on Nov. 29, 1993, now abandoned.

FIELD OF THE INVENTION

This invention relates to the oil industry, and more particularly, to a device and method for removing fines, such as sand, from a crude oil tank.

BACKGROUND OF THE INVENTION

A significant number of oil reserves contain crude oil having an undesirably high concentration of fines, such as sand and clay, which can make the oil unsuitable for many uses. The oil industry has attempted to address the problem of removing a sufficient amount of the fines from the crude oil to achieve an acceptable concentration of fines within the oil. However, a significant problem with conventional processes is the need for multiple processing steps to remove the fines from the oil, thus increasing the cost and time for the removal process.

U.S. Pat. No. 4,995,495 shows one example of a conventional apparatus and process for upgrading the purity of crude oil. The apparatus disclosed therein requires a relatively intricate flashing arrangement, and further requires the step of heating the crude oil to separate the crude oil from the fines. Heating the crude oil to separate it from the fines significantly increases the time and energy required to extract the sand from the oil, thus driving up the cost of the process. As a result, a need has arisen for a more cost effective and time efficient method for removal of fines from oil.

OBJECTS AND SUMMARY OF THE INVENTION

It is an object of the present invention to provide an efficient and cost effective device and method for extracting fines, such as sand, from a crude oil tank.

It is also an object to provide an apparatus for injecting an immiscible fluid into the oil in a storage tank to create a slurry of fluid and fines so that the fines can be readily removed from the oil within the storage tank.

It is another object of the invention to provide an additional apparatus capable of extracting the slurry from the storage tank substantially simultaneously with the creation of the slurry so that the time required to remove the fines from the storage tank is reduced.

It is a further object of this invention to provide a modified truck having a pressure line pump and a drain line pump mounted thereon which can be readily connected to the slurry forming and removal pipes within the crude oil storage tank so that the slurry within the tank can be extracted rapidly and directly to the bed of the truck and conditioned therein to a form ready for disposal.

To accomplish these and related objects of the invention, a method of extracting fines from a crude oil tank is provided. The method generally comprises directing a fluid into the bottom of the tank to stir up the fines which have settled at the bottom of the tank. The fluids and fines form a slurry which is then removed from the tank through a drain line. The step of directing a fluid into the tank preferably comprises the steps of placing a pressure pipe, having apertures, within the tank, coupling the pipe to a pump outside of the tank, and activating the pump to direct fluid through the pressure line and out of the apertures in the pipe and into the fines, thereby creating the slurry.

The device used to accomplish the extraction method generally comprises a pressure line having apertures formed in the line. The apertures are adapted to release a pressurized fluid therethrough to create a slurry in the tank. The device also includes a drain line having apertures formed in the line. The drain line apertures are adapted to receive the slurry therethrough.

In another aspect of the invention, a truck is provided which has a pump mounted thereon. The pump is adapted to be coupled to the pressure line outside of the crude oil tank for supplying pressurized fluid through the pressure line. The fluid exits the pressure line through the apertures and is directed to the storage area of the tank to create a slurry. The same or an additional pump is provided for suctioning the slurry through the drain line apertures into the bed of the truck. In the preferred embodiment, the truck is capable of dumping the fines from the bed of the truck at a desired location.

Thus, it can be seen that the present invention overcomes the problems associated with the prior art. The method disclosed essentially involves a simultaneous two step process whereby a fluid stirs up fines in the bottom of the tank and a pump simultaneously removes the sand and fluid out of the tank through a drain line. Further, the structure requires only conventional, low cost pipes with holes drilled therein. Moreover, the modified truck, retrofitted with pumps, allows quick coupling of the pumps to the pipes and also allows the sand or other fines to be extracted directly from the oil tank to the bed of the truck. The truck can thereafter be driven to the desired dumping site for safe disposal of the sand. In sum, the method and structure disclosed herein provide an efficient and cost effective means for removing sand from the storage tank.

BRIEF DESCRIPTION OF THE DRAWINGS

In the accompanying drawings which form a part of the specification and are to be read in conjunction therewith and in which like reference numerals are used to indicate like parts in the various views:

FIG. 3 is a fragmentary side elevational view of the crude oil tank taken in vertical section along the plane of line 3—3 in FIG. 2 in the direction of the arrows;

FIG. 4 is a fragmentary side elevation view of the drain line with portions broken away to show details of construction;

FIG. 5 is an end elevation view of the pressure line and drain line taken in vertical section along the plane of line 5—5 in FIG. 3 in the direction of the arrows;

FIG. 6 is an end elevational view of the pressure line and a brace member taken in vertical section along the plane of line 6—6 in FIG. 2 in the direction of the arrows;

FIG. 7 is an end elevational view taken in vertical cross section along the plane of line 7—7 in FIG. 2 in the direction of the arrows, showing the brace member supporting the pressure line;

DESCRIPTION OF THE PREFERRED EMBODIMENT

Figure 1:
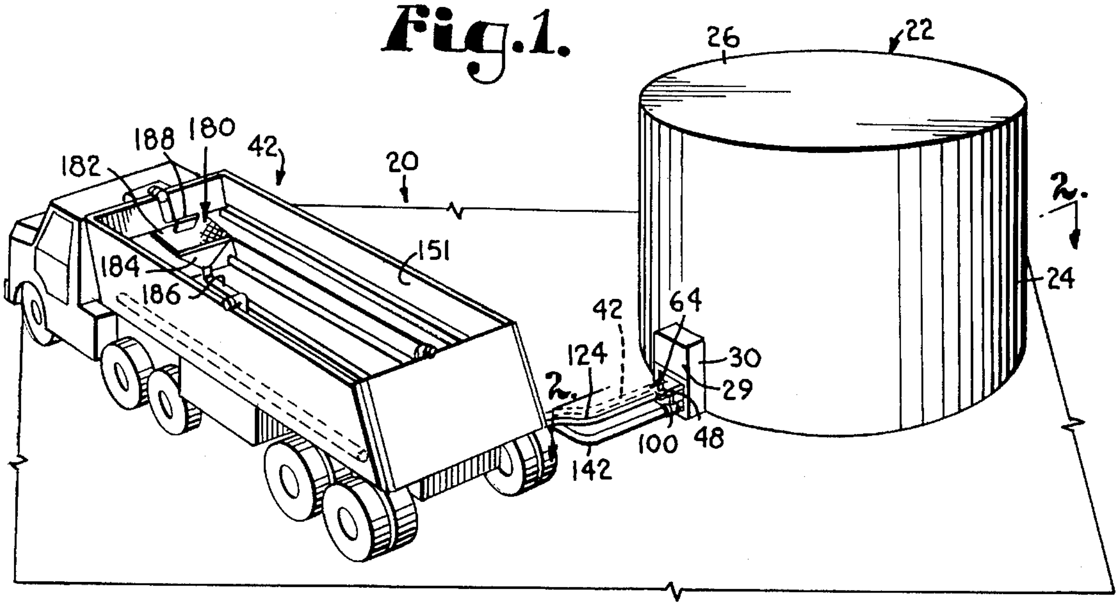
FIG. 1 is a perspective view showing a crude oil tank and a truck modified according to one aspect of the invention for removing fines contained within the oil in the tank.
Figure 2:
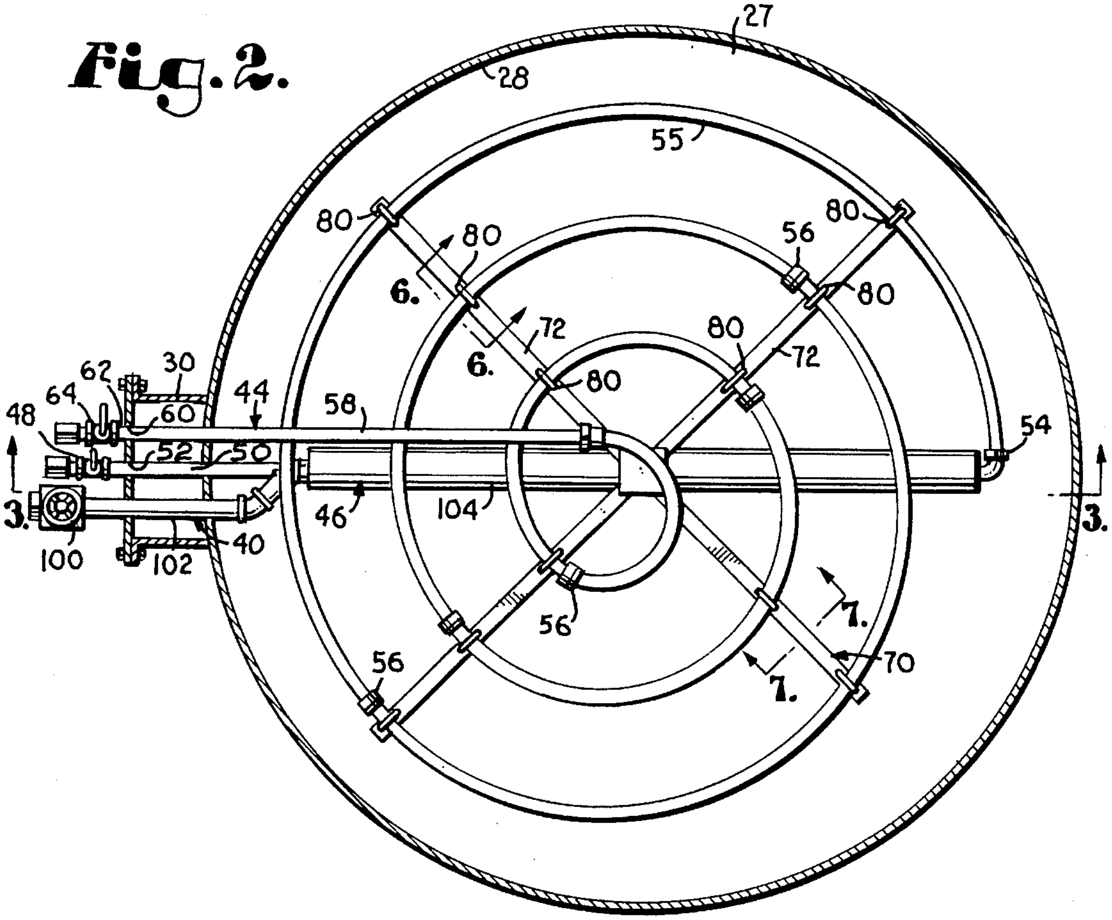
FIG. 2 is a top plan view of the crude oil tank taken in horizontal section along the plane of line 2—2 in FIG. 1 in the direction of the arrows, showing the positioning of the pressure line and drain line within the crude oil tank.

Referring now to the drawings in greater detail and initially to FIGS. 1 and 2, a desanding system according to a preferred embodiment of the present invention is designated generally by the numeral 20. System 20 is adapted to remove fines, such as sand, from a crude oil tank 22. The sand and other fines enter tank 22 with crude oil that is pumped from an oil reservoir into tank 22 for temporary storage. The desanding system 20, and the methods of implementing the system, allow the fines, most typically sand, to be removed efficiently and cost effectively from the tank after the fines settle to the bottom of the tank.

Tank 22 comprises a cylindrical sidewall 24 and a generally circular top 26 secured to the top edge of the cylindrical wall. The tank also includes a bottom 27 (shown in FIG. 2) which in combination with sidewall 24 and top 26 form a storage area 28 for the crude oil. Tank 22 includes an access door 29 secured to sidewall 24 by a frame 30, as is well known in the art. Access door 29 provides access to the storage area 28 of the tank when it is empty.

Desanding system 20 generally comprises, in one aspect of the invention, a pipe system 40 (shown in FIG. 2) for removing the sand from tank 22, and in another aspect of the invention, a modified truck 42 (shown best in FIG. 1) adapted to be used in conjunction with pipe system 40 for automated removal of the sand from the oil tank.

Referring more particularly to FIG. 2, pipe system 40 includes a pressure line 44 for injecting a fluid into a bottom portion of tank 22 to create a sand/fluid slurry and a drain line 46 for removing the slurry from the tank. The preferred fluid is water because of its low cost and because it has a specific gravity less than oil. However, other fluids could be used. Pressure line 44 is preferably a galvanized pipe having a two (2) inch inside diameter. A pressure line valve 48 is coupled to a first end 50 of pressure line 44 to allow for selective opening and closing of the first end for reasons described below. Pressure line 44 extends from pressure line valve 48 through a sealed hole 52 in access door 29 into storage area 28. Referring to FIGS. 2 and 4, within the storage area, the pressure extends through drain line 46, and is preferably secured to the inside of the pressure line by welding. The pressure line extends through a sealed outlet 53 at the other end of the drain line and is connected to a fitting 54. The pressure line includes a coiled portion 55 which is substantially concentrically aligned with sidewall 24 of tank 22 and is connected to fitting 54. Coiled portion 55 is preferably comprised of several sections of bent pipe joined together by fittings 56 to facilitate manufacture of the coiled portion. Pressure line 44 includes a straight section 58 which extends from the end of the coiled portion through a sealed hole 60 in access door 29 and terminates at its second end 62 in an end valve 64. Valve 64 provides for selective opening and closing of the second end 62 of pressure line 44.

As best shown in FIGS. 3 and 7, the pressure line 44 is supported approximately eight (8) inches above the bottom 27 of tank 22 by a suitable frame 70. Frame 70 comprises two elongated angle iron sections 72 secured in generally orthogonal relation by a bracket 74. Legs 76 extend between the tank bottom 27 and each angle iron section 72 to elevate pressure line 44 above the bottom of tank 22. Pressure line 44 is firmly secured to the top of the angle iron sections 72 by pipe brackets 80 and corresponding nuts 84 (shown in FIG. 6). Pipe brackets are preferably located at every "cross over" of the pressure line 44 and frame 70, as shown in FIG. 2. Thus, frame 70 supports and maintains line 44 in a generally horizontal position approximately eight (8) inches above the bottom 27 of tank 22.

Pressure line 44 further includes outlet ports 90 for releasing a fluid, such as water, under pressure to stir up the fines (e.g., sand) which have settled in the bottom 27 of tank 22. A pump is coupled to first end 50 of line 44, as described below, to pump the fluid through the pressure line under pressure, thereby causing the fluid to be jettisoned through outlet ports 90. The outlet ports are formed in the line, such as by drilling, and are angled downwardly, preferably at approximately forty-five (45) degrees from the vertical. Outlet ports 90 are preferably approximately one-eighth (⅛) of an inch inside diameter, and are located in an alternate fashion in two spaced apart rows which extend along the length of the pressure line. The spacing between the rows of outer ports 90 can be varied as desired, but a spacing of approximately one inch has been found to produce an acceptable mixing of the fluid discharged through ports 90 with the sand resting on the bottom of tank 22. Also, the outer portion of the coiled pressure line 44 is preferably located about one (1) foot from cylindrical sidewall 24 of tank 22. Thus, the coiled portion extends substantially within the sidewall of the tank.

The outlet ports 90 may optionally be fitted with nozzles which provide greater directional control over the path of the fluid being discharged form pressure line 44. The nozzles can be fixed but directionally adjustable so that the desired pattern of fluid discharge from pressure line 44 can be achieved. Some or all of the nozzles can also, or alternatively, be rotatable to further facilitate mixing of the discharged fluid with the fines which have settled on the bottom of the tank 22.

Referring again to FIG. 2, drain line 46 includes a drain valve 100 connected at its first end 102 to allow the first end to be selectively opened and closed. At its first end, the drain line has a three (3) inch inside diameter. The drain line 46 extends from its first end to an enlarged drain line section 104 which preferably has a seven (7) inch inside diameter. The enlarged section 104 rests on the bottom 27 of tank 22. The enlarged section 104 extends along a substantial portion of the tank diameter and, as shown, is approximately seven (7) feet in length. The enlarged drain line section 104 is preferably spaced about one (1) foot from the sidewall of the tank 22. The drain line also has sealed ends 108 for sealing the drain line for fluid communication.

As can be seen in FIG. 5, drain line 46 has inlets 110 for suctioning the sand/fluid slurry created by the discharge of the fluid from the pressure line outlet ports 90. The inlets are formed in drain line 46, such as by drilling. Inlets 110 have a two (2) inch diameter, and are angled downwardly, preferably at forty-five (45) degrees from the vertical. Thirty to forty inlets are preferably evenly located alternately on each side of line 46 along the enlarged section 104 of drain line 46. As will be described in greater detail below, a vacuum pump is connected to the drain line 46 to suction the slurry through the inlets 110 and out of the storage area 28 of tank 22. The number and size of the inlets 110 could be varied to produce the best suctioning performance based upon particular applications. Larger size inlets decrease the suctioning pressure produced by a given pump but increase the area through which the slurry is suctioned. The two (2) inch inlets have been found to be a preferable size in certain applications.

Referring to FIGS. 1 and 8–10, in another aspect of the invention, the modified truck 42 is equipped to work in conjunction with pressure line 44 and drain line 46 to remove the sand from the bottom 27 of tank 22. A pressure line pump 120 is mounted to truck 42 and a flexible hose 124 is adapted to be secured between a fitting 126 of the pressure line pump and the pressure line valve 48. Pump 120 supplies a fluid, preferably a liquid such as water, under pressure through hose 124, through pressure line valve 48 (when in the open position), through the pressure line 44, and out of the outlets 90. The discharged fluid is directed into the fines on the tank bottom 27 to cause agitation thereof. The fines then become suspended in the fluid to create a slurry which can be removed through drain line 44. Preferably, the fluid should be immiscible with the oil so that the slurry forms a layer within the oil. A supply tank 128 can also mounted to the truck for supplying water or other fluid to pressure line pump 120 through hose 130 or the pressure line pump can be coupled to an external fluid source.

Figure 8:
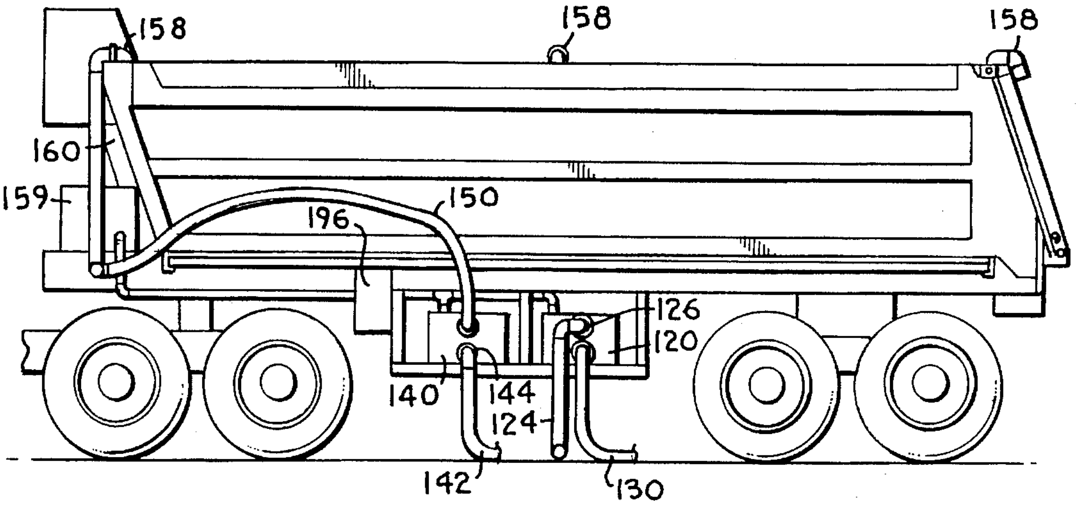
FIG. 8 is a fragmentary side elevational view of the truck having pumps mounted thereto for removing fines from the crude oil tank.

Referring to FIGS. 1 and 8, drain line pump 140 is mounted to truck 42, and a flexible hose 142 is similarly adapted to be secured between a fitting 144 of pump 140 and drain line valve 100. Drain line pump 140 provides a suctioning force which extracts slurry caused by the pressure line through the inlets 110, through drain line 46, through hose 142, and through a hose 150 directly into the bed 152 of truck 42. Hose 150 is adapted to be coupled to one of three dump nozzles 158 mounted to the bed of the truck on the front, side, and back, respectively. As shown, hose 150 is coupled to the dump nozzle at the front of the bed of the truck. However, if the fines stack up in a particular area of the bed of the truck, hose 150 can be reconnected to the side or back dump nozzle to more distribute the fines within the bed.

The two pumps are coupled to an air compressor 159. Each pump requires approximately 100 cubic feet per minute of air at approximately 100 psi to operate. The two pumps are preferably diaphragm pumps which are designed to handle large quantities of sand without breaking down.

The bed of truck 42 is preferably equipped with a hydraulic system 160, such as found on a dump truck and the like, to facilitate dumping of the fines in the bed of the truck at a desired location.

The truck 42 can also include a shale shaker 180, as shown in FIG. 1. The shale shaker is mounted in the bed of the truck below dump nozzle 158. The shale shaker includes a screen 182. The fine and water slurry ejected from nozzle 158 dumps onto screen 182. The mesh of the screen allows the water to pass through the screen but prevents the fines from passing through. A funnel 184 is coupled to the screen. A pipe 186 is secured to the bottom of funnel 184. Thus, water passing through screen 182 is funneled into pipe 186 which extends to the back of the bed of the truck. The shale shaker also includes a deflection plate 188 and a shaker apparatus (not shown) secured to the screen, as is well known. The deflection plate 188 directs the fines to the side and the shaker causes the fines to vibrate off of the side of the screen to prevent pile up of fines on the screen. The shale shaker therefore separates the fines from the water by directing the water to the back of the bed of the truck while accumulating fines from the front of the bed towards the back of the bed.

Figure 9:
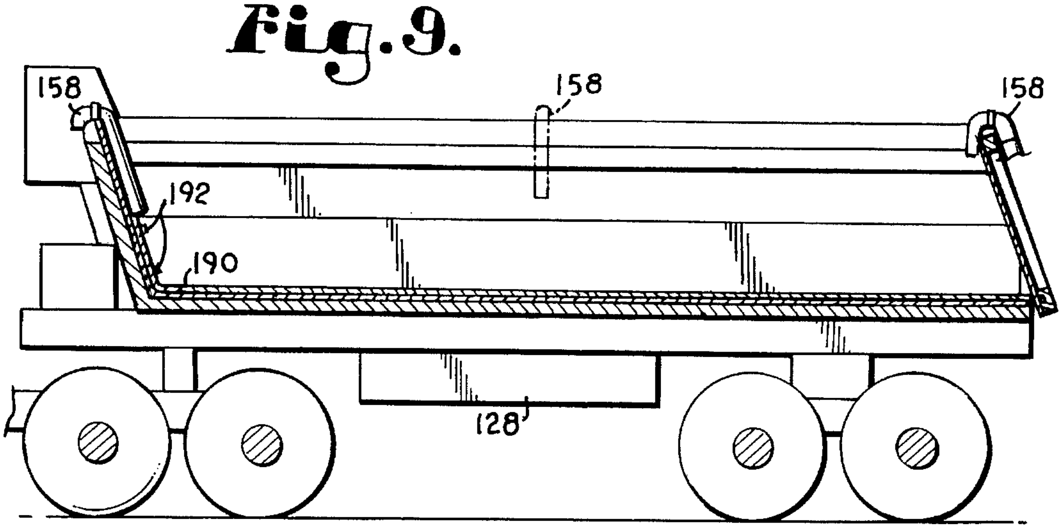
FIG. 9 is a fragmentary side cross sectional view showing the bed of the truck.
Figure 10:
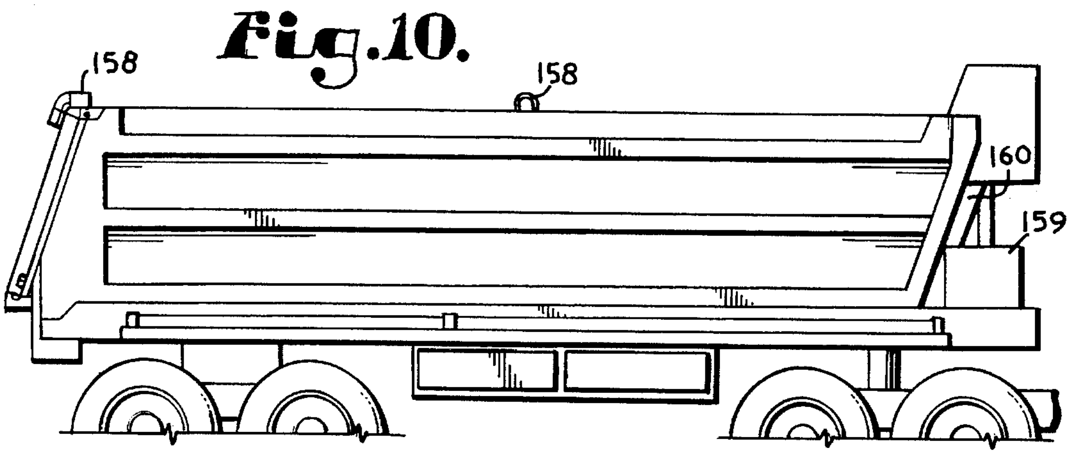
FIG. 10 is a fragmentary side elevational view similar to FIG. 8, showing the other side of the truck.

The bed 152 of the truck can also include a lining 190 having a slippery upper surface to facilitate dumping of the fines from the bed of the truck, as shown in FIG. 9. Lining 190 can be secured to the bed of the truck by bolts 192 or other suitable securing devices. An example of a suitable liner is being marketed under the trademark QuickSilver® which is manufactured of TIVAR-UHMW polymer, Poly Hi Solidur. Such a liner is very thin and has a low coefficient of friction, yet is extremely durable. The liner can be secured to the bottom of the bed and the side walls of the bed, as shown in FIG. 9, but can also be secured only to the bottom of the bed (not shown). Alternatively, the bed 152 can be coated with a lubrication substance to facilitate dumping of the fines from the bed.

Referring to FIG. 8, a vibration unit 196 can be mounted to the bottom of bed 152. Vibration unit 196 facilitates dumping of fines from the bed by vibrating the bed when it is raised to a dumping position. The vibration unit can be coupled to the hydraulic system to receive power to impart vibration to the bed, as is well known in the art.

Operation

A crude oil tank, such as tank 22, can be retrofitted with pipe system 40 which generally comprises pressure line 44 and drain line 46, or new tanks can be manufactured with the pipe system situated therein as described above.

In use, an oil tank having the pipe system 40 in its storage area 28 is adapted to be coupled to an oil reserve through a well head, in the same manner as with conventional tanks. Crude oil is pumped from the reserve through the well head and into tank 22. Fines, such as sand or clay, settle to the bottom 27 of the tank under and around pipe system 40 after a relatively short time. After the fines have settled to the bottom of the tank, it is appropriate to implement the method and system disclosed herein for removing a substantial amount of the settled fines to achieve an acceptable concentration of fines within the oil.

The modified truck 42, as described above, is driven to the site of the tank requiring desanding. The pressure line pump 120 is coupled to pressure line 44 by connecting hose 130 between the pump and pressure line valve 48. Drain line pump 140 is coupled to drain line 46 by connecting hose 142 between the drain line pump and drain line valve 100. With the hoses connected, valves 48 and 100 are opened so that the pumps are in fluid communication with the lines. Pressure line pump 120 is then activated to supply a pressurized fluid through pressure line 44 and out of the outlet ports 90. The jettisoned fluid from the outlet ports is directed into the settled fines to create a slurry with the fines suspended in the fluid. Drain line pump 140 is then activated immediately after the pressure line pump to apply a suction force to drain line 46. The suction force draws the slurry through inlets 110 and into drain line 46. The slurry then travels through hoses 142 and 150 directly into the bed 152 of truck 42.

During normal operation of the desanding system 20, end valve 64 for pressure line 44 is closed to prevent pressurized fluid from exiting the valve because the fluid is intended to be discharged through outlet ports 90. However, the pressure line can become clogged with fines due to its smaller diameter. To unclog the pressure line, pressure line pump 120 and drain line pump 140 should be turned off, and drain line hose 142 should be disconnected from drain line valve 100 (after closing valve 100), and should be reconnected to end valve 64 of the second end 62 of pressure line 44 (shown best in FIGS. 1 and 2). End valve 64 should thereafter be opened. The pressure line and drain line pumps should then be turned on again. Pressure line pump 120 discharges pressurized fluid through the first end 50 of pressure line 44, and drain line pump 140 applies a suction force to the second end 62 of the pressure line. The combined forces of the pressure line pump and the drain line pump clear the fine buildup within the pressure line and it is suctioned through drain line hose 142 into the bed of the truck.

After the clog is cleared, the pumps should be turned off, and end valve 64 should be closed. Hose 142 should be reconnected to drain line valve 100, and valve 100 should be reopened. The pumps can be turned on again to continue with the removal of fines.

It is also noted that the section of the pressure line within the drain line has outlet ports 90 to prevent clogs within the drain line during the suctioning operation.

For most tanks, the removal of fines takes about a half hour, but the time varies slightly depending on the concentration of fines within the oil. When the operation is complete, the slurry being dumped through hose 150 into the bed of the truck will be substantially liquid, thus indicating that the majority of fines have been removed from tank 22. The length of the process will also vary depending upon the size of the tank. Further, for tanks having a larger diameter, the drain line and pressure line dimensions should be altered so that the respective lines are approximately one foot from the sidewall of the tank 22.

After the process for removal of fines is complete, pressure line valve 48 and drain line valve 100 can be closed, and the corresponding hoses 130 and 142 can be disconnected for storage on the truck. The truck can be driven to a desired dumping location, and the sand can be dumped from the bed by hydraulically raising the bed so that the fines slide out of the back end of the bed. Treatment or cleansing of the sand prior to disposal may be necessary.

It can therefore be seen that the present system and method for removing fines from a crude oil tank is effective and efficient. The truck is driven to the site of an oil tank requiring desanding. The pumps on the truck can be connected to the pipe system for automatically removing fines from the tank into the bed of the truck. After the process is completed, the truck can be driven to a desired dumping location for disposal of the fines.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A method of extracting fines, such as sand and clay, which have settled at a bottom of an oil tank containing said fines and oil, the method comprising the steps of:

directing a fluid which is immiscible with the oil into the bottom of the tank to stir up the fines settled at the bottom of the tank to create a layer of a slurry of said fluid and fines within the oil; and removing the slurry from the oil in the tank by directing the slurry from the tank through a drain line.

2. The method of claim 1 wherein the step of directing a fluid comprises placing a pressure line, having apertures, within the tank, coupling the line to a pump outside of the tank, and activating the pump to force the fluid through the pressure line and out of the apertures in the line and into the fines, thereby creating the slurry.

3. The method of claim 2 wherein said tank has a diameter, and wherein the pressure line is placed within the tank in a generally horizontal, coiled position, and the drain line extends transversely across the diameter of the tank.

4. The method of claim 3 wherein the drain line includes apertures for receiving the slurry therethrough and wherein the apertures for the pressure line and drain line are directed downwardly and alternately along the pressure line and drain line, respectively.

* * * * *